G. W. GOODRIDGE.
ELECTRIC LAMP SOCKET.
APPLICATION FILED NOV. 26, 1909.
Reissued Apr. 18, 1911. 13,227.
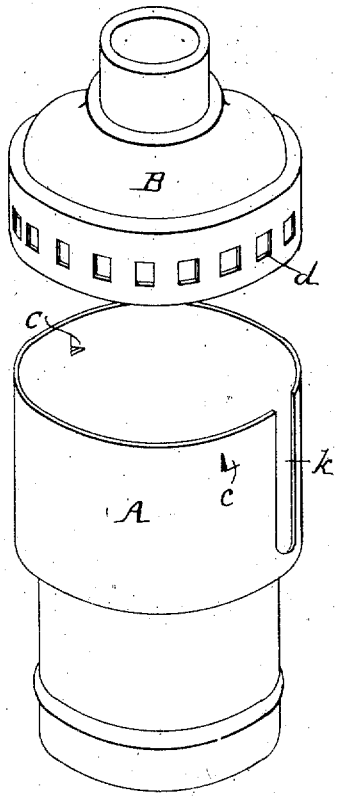
WITNESSES:
L. H. Grote
M. E. Kerr
INVENTOR
Gilbert W. Goodridge
BY
Howson and Howson
ATTORNEYS

UNITED STATES PATENT OFFICE.

GILBERT W. GOODRIDGE, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

ELECTRIC-LAMP SOCKET.

13,227. Specification of Reissued Letters Patent. Reissued Apr. 18, 1911.

Original application filed July 18, 1907, Serial No. 384,732. Divided and application filed October 26, 1907, Serial No. 399,265. Original No. 879,819, dated February 18, 1908. Application for reissue filed November 26, 1909. Serial No. 530,070.

*To all whom it may concern:*

Be it known that I, GILBERT W. GOODRIDGE, a citizen of the United States of America, residing at Bridgeport, in the county of Fairfield, in the State of Connecticut, have invented certain new and useful Improvements in Electric-Lamp Sockets, of which the following is a specification.

In mounting an electric lamp socket upon a fixture or pipe, the cap is first screwed into place and then the insulated lamp socket terminals are connected up to the wires, and finally the socket shell is connected up to the cap. In mounting these sockets, particularly key sockets, on fixtures and elsewhere, with ornamental husks, the key has to be arranged to project through one part of the ornamental husk and consequently the shell has to be put on in a certain position, considered rotarily. With the construction of bayonet joints or other shell and cap fastenings now in use, those two parts, the cap and shell, can be fitted together only when brought into one certain relation to each other, and since that relation is apt to be such as not to permit the key to then pass into the key slot and through the necessary slot in the husk, the only remedy is for the wireman to unscrew the socket cap again and file down its nipple sufficiently to permit the cap when screwed on the pipe end again to be turned to a position where the socket key stem will suitably enter the key slot in the shell and also the slot in the husk. To meet this trouble I have devised a new socket and shell fastening, which permits the shell to be applied and automatically latched to the cap in any relative rotary position of the two parts. This I accomplish by providing coöperating latching means on the two parts, the latching elements on one of the parts being greater in number than on the other part and many times repeated and arranged symmetrically around the circumference.

In the accompanying drawing is shown an enlarged perspective view of a socket embodying my invention.

In the form shown the flange of the cap B is provided with rectangular openings *d* which are many times repeated and are symmetrically arranged around its circumference. The coöperating latching means on the shell A are shown as consisting of two angled tongues *c* cut out of the metal of the shell and pressed outwardly, one cut or angle of each tongue being parallel with the end of the shell so that when latched into any opening *d* it will hold the shell and cap together against endwise motion. The other angle of each tongue is substantially parallel with the axis of the shell and the two angled tongues being cut to face in the same direction as shown, they so engage the side walls of the openings *d* when latched as to prevent the shell from turning in the cap. One of the parts is made with a yielding body so that by displacement of said yielding body by extraneous means, the latching devices may be readily disengaged. Thus in the case shown the shell may be detached by the application of manual compression on the wall of the shell back of the latch *c* adjacent to the key slot *k*.

It will thus be seen that owing to the number of symmetrically arranged openings *d* in the cap, the shell may be fitted and latched to the cap with a simple endwise movement and with the key slot *k* in almost any position (relatively to the cap rotarily) which the conditions may require.

I do not wish to restrict myself to the precise construction of latching means shown, which may be varied in many ways without escaping the breadth of my invention.

I claim as my invention—

1. The combination with a two-part lamp socket consisting of a shell and cap, of a plurality of engaging means on each of said parts, the engaging means on one part being symmetrically repeated around its circumference and exceeding in number the means on the other part.

2. An electric lamp socket having the end of the shell provided with projections and having the cap flange provided with a greater number of symmetrically arranged openings with any of which the projections in the shell can latch.

3. An electric lamp socket having a cap and shell fitting together telescopically and provided with readily freed automatic endwise latching means brought into engagement by simple endwise movement of the parts with relation to each other, said endwise latching means on one part exceeding circumferentially the coöperating latching means on the other, for the purpose described.

4. An electric lamp socket having a shell and cap fitting together telescopically and provided with automatic latching means brought into engagement by simple endwise movement of the parts with relation to each other, in substantially any relative rotary position of the said parts, said cap and shell being provided with means to prevent the shell from turning when so latched, said parts being readily detachable from each other.

5. An electric lamp socket having shell and cap, together with readily freed engaging means therefor latching in substantially any relative rotary position of the parts and means for preventing rotary movement of the parts with relation to each other.

In testimony whereof I have signed my name to this specification, in the presence of two subscribing witnesses.

GILBERT W. GOODRIDGE.

Witnesses:

S. E. Goodsell,

W. C. Bryant.